Dec. 11, 1951     R. GOLDMAN     2,578,238
AUTOMOBILE LUGGAGE AND SUPPORT THEREFOR
Filed March 29, 1949     2 SHEETS—SHEET 1
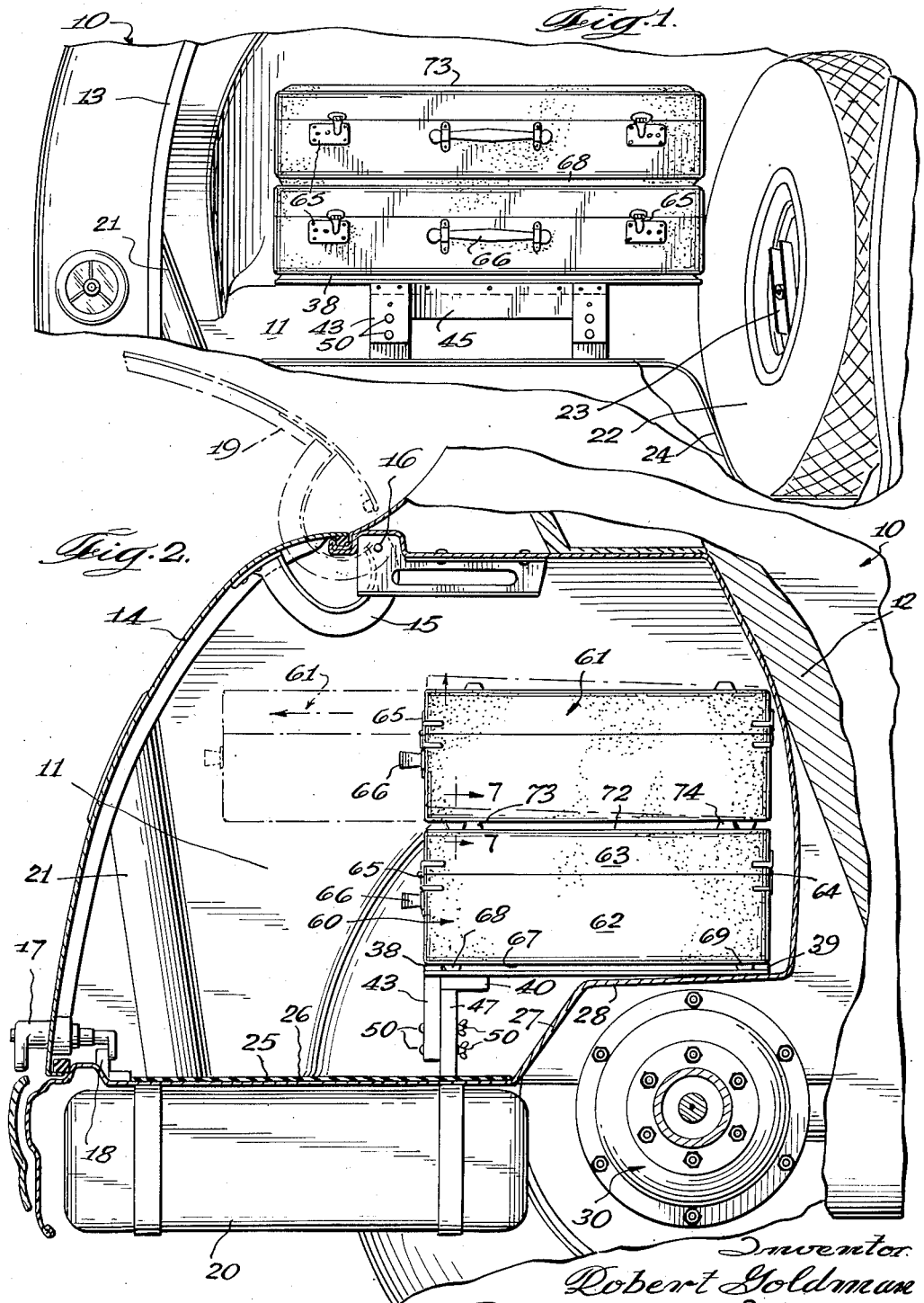

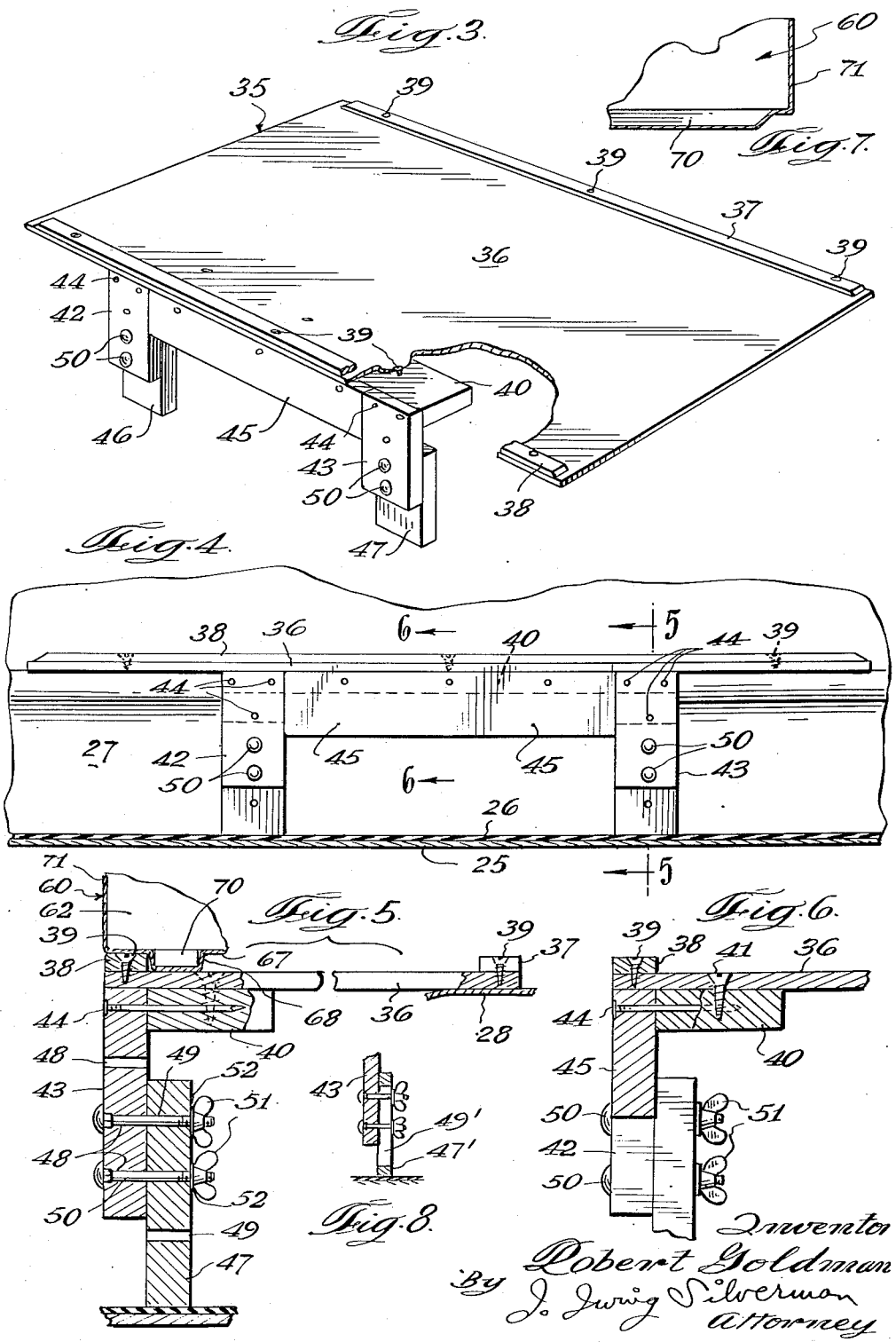

Patented Dec. 11, 1951

2,578,238

UNITED STATES PATENT OFFICE 2,578,238

AUTOMOBILE LUGGAGE AND SUPPORT THEREFOR

Robert Goldman, Chicago, Ill.

Application March 29, 1949, Serial No. 84,141

2 Claims. (Cl. 224—42.42)

This invention relates generally to luggage and more particularly is concerned with automobile luggage and a platform for supporting the same.

One of the principal objects of the invention is to provide luggage adapted to be stowed in the rear compartment of an automobile and to provide a platform for the same whereby the space in the rear compartment is more efficiently used than heretofore.

Another object of the invention is to provide a platform for supporting luggage in the rear compartment of an automobile, which will be constructed in such a manner as to utilize space in the rear compartment not heretofore available for storage due to the presence of a hump on the floor of said compartment.

Still a further object of the invention is to provide a platform of the character described for the support of luggage thereon which will have means for adapting same readily to different shapes of automobile rear compartments.

Another object of the invention is the provision of means upon the luggage and the compartment whereby the luggage pieces and the platform are all cooperatively interlocked to prevent same from being disturbed during the movement of the automobile, and yet which are readily separable for removal from the automobile.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of this invention, there is illustrated in the accompanying drawings a preferred embodiment thereof, from an inspection of which, when considered in connection with the following description, this invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is an elevational view looking into the opened rear compartment of an automobile and showing my new platform having two pieces of luggage constructed in accordance with my invention installed thereon.

Fig. 2 is a sectional view taken through the rear compartment with the luggage arranged as in Fig. 1, but with the door closed.

Fig. 3 is a perspective view of the platform of my new invention.

Fig. 4 is a front elevational view of the platform.

Fig. 5 is a sectional view taken through one of the supporting legs of the platform along the line 5—5 of Fig. 4 and in the indicated direction.

Fig. 6 is a sectional view taken along the line 6—6 of Fig. 4 and in the indicated direction.

Fig. 7 is a sectional fragmentary view taken through a luggage case along the line 7—7 of Fig. 2 and in the indicated direction.

Fig. 8 is a view similar to that of Fig. 5, but on a reduced scale and showing a modified form of the invention.

Referring now to the figures, the reference character 10 designates generally an automobile having a rear compartment 11 which is intended to be used for the storage of tools, luggage and the like. The luggage compartment 11 illustrated is formed to the rear of the seat 12 and has an opening 13 adapted to be covered by the door 14 which has a hinge 15 pivoted to the chassis at 16. The bottom of the door has a latching device 17 adapted to cooperate with a lug 18 to secure the door in place. The position of the door 14 and hinge 15 when opened are shown at 19 in broken lines of Fig. 2. For clarity of illustration, I have shown a gasoline tank 20 strapped below the compartment 11 and having an inlet conduit 21. There is also shown, on the right side of the compartment a spare tire 22 secured by the clamping device 23 in a depression 24 formed for this purpose on the floor 25 of the compartment.

Calling attention to the floor 25, which is usually covered with a protective pad 26, note that same is connected to a higher level 27 by a sloped portion 28. The width of the higher level 27 (left and right as viewed in Fig. 2) is considerably less than the floor 25 which is disposed immediately over the gas tank 20 and in most cases of modern automobiles slants downwardly. The result of this construction is that luggage or packages or containers cannot be carried upon this level or ledge 28 or upon the sloped portion 27 giving rise to considerable waste space within the compartment 11.

The construction described is prevalent in most modern automobiles by reason of the fact that modern design requires the chassis and body 10 to be slung as low as possible in order to lower the center of gravity and give good stability. The lowering of the body, however, has not changed the level of the differential housing, which is indicated generally at 30 in Fig. 2 and hence the floor of the rear compartment of most automobiles must have a raised level corresponding to the level 28 shown in the drawings herein. In many instances, the space for the housing 30 is provided merely by forming a central hump in the compartment, but the utility of such a hump is as little as, if not less than a level which extends completely across the compartment.

By means of my new invention, the greater part of the space lost by the presence of the level 28 or hump in other automobiles is utilized in a highly efficient manner for the stowage of luggage or the like as will be hereinafter described.

I provide a two-legged platform, the legs being on the front edge thereof and the platform adapted either to overlie the upper level 28, or engage at the center thereof with the hump of otherwise constructed automobiles. Said platform is especially intended to be used to support luggage cases, and consequently has protruding ridges thereon adapted to cooperate with mating ridges provided on my luggage cases securely to support same upon the platform.

The reference character 35 is used generally to designate my platform, a perspective view of the same being shown in Fig. 3. Said platform includes a horizontal rigid sheet member 36 of generally rectangular formation provided upon its rear and front edges with upstanding ridges 37 and 38 respectively held to the sheet member 36 by screws 39 or other fastening means. The sheet member 36 and ridges 37 and 38 may be formed of plywood, pressed wood, or other substance, and it is also within the scope of my invention to form the same from sheet metal with said ridges stamped therein. A stiffening member 40 is attached to the underside of the sheet member 36 at the front thereof by the screws 41 and extends at least partially along the length thereof and in the center thereof. At each end of the stiffening member 40 are secured downwardly extending legs 42 and 43 which are secured by nails 44 or the like and which are braced by an elongated member 45 secured to the stiffening member 40.

The legs 42 and 43 have adjustable extensions 46 and 47 respectively which enable the platform 35 to be installed in different automobiles having the level 28 different distances above the respective floors 25. The legs 42 and 43 are provided with a plurality of holes 48 passing therethrough, and the extensions 46 and 47 have similar holes 49 along the lengths thereof. Fastening devices such as for example, carriage bolts 50 are adapted to be inserted through the holes and affixed by means of wing nuts 51 and intervening washers 52 in order to secure the extensions 46 and 47 upon the legs 42 and 43 to obtain any desired height of the sheet member 36 above the floor 25. Instead of the extensions being perforated as described, same may be formed with slots to obtain the same result, i. e., adjustable height for the platform. In Fig. 8 I have shown the extension 47' having a slot 49', corresponding in position and function to the extension 47 and holes 49 of Fig. 5.

In order most efficiently to utilize the platform 35 described, I have devised luggage cases for use therewith as shown at 60 and 61. Since the constructions thereof are identical, a description of one will suffice.

The luggage case 60 consists of a rectangular body portion 62 which is preferably of the same length and width as the sheet member 36. A rectangular cover 63 is hingedly secured at 64 to the body and cooperative latching devices 65 are provided to lock the cover in place. A carrying handle 66 is attached in any well-known manner. On the bottom surface 67 I provide parallel ridges 68 and 69 which are generally of the same shape and size as ridges 38 and 39, but are spaced apart a distance less than the ridges 38 and 39 such that when placed upon the platform, the ridges 68 and 69 will engage within the ridges 38 and 39.

The case 60 may be covered with leather, or fabric of any kind, and I prefer securing the strips to forming the ridges prior to covering the case. The ends of the strips 70, may be beveled as shown in Fig. 7. The covering is indicated at 71.

Besides providing means to cause interlocking between case 60 and platform 35, the ridges 68 and 69 protect the case when same is placed upon a rough surface, much in the manner of the well-known protuberances used for this purpose. The principal purpose for such ridge, however, is as set forth, to provide interlocking between case 60 and platform 35.

The upper surface 72 of the cover 63 is provided with similarly constructed ridges 73 and 74 which are spaced inwardly a slight amount less than the distance between ridges 68 and 69. When the case 61, of identical construction to case 60 is placed on top of case 60, its ridges 68' and 69' will engage outside of ridges 73 and 74 thereby securing the case 61 on top of case 60. In this manner, any number of cases can be piled one on top of the other, depending upon the height of compartment 11. Forward movement is prevented by reason of the interlocking ridges. Lateral movement is prevented by the sides of the compartment and by frictional engagement between ridges. In addition the compartment can be used for stowing additional articles as will be obvious from Fig. 2.

To remove the luggage cases, it is necessary first to lift same over the ridges as indicated by the broken lines 75 of Fig. 2, and then to pull same forward as indicated by broken lines 76 of Fig. 2.

It is believed that this invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of this invention as defined in the appended claims.

What is claimed and desired to be secured by Letters Patent of the United States is:

1. A platform for use in the rear compartment of an automobile having a protuberance in the floor of said compartment which comprises, a sheet member having front and rear substantially parallel edges, the bottom of said member adapted to engage said protuberance adjacent the rear edge thereof, and support members secured adjacent the front edge and adapted to extend from the sheet member to said floor whereby to render the said sheet member a horizontal article-supporting platform disposed entirely within said compartment, said support members comprising a pair of extensible feet substantially spaced apart to stabilize said platform, said sheet member having ridges coextensive with said edges formed thereon adapted to be disposed perpendicular to the line of travel of the automobile when the platform is installed in said compartment, said ridges adapted to engage articles supported thereon to prevent same from sliding off of said platform, and a luggage case having similarly positioned ridges on the bottom thereof adapted to interengage with the ridges of the sheet member when said case is placed thereon.

2. A platform for use in the rear compartment of an automobile having a protuberance in the floor of said compartment which comprises, a sheet member having front and rear substantially parallel edges, the bottom of said member adapted to engage said protuberance adjacent the rear edge thereof, and support members secured adjacent the front edge and adapted to extend from the sheet member to said floor whereby to render the said sheet member a horizontal article-supporting platform disposed entirely within said compartment, said support members comprising a pair of extensible feet substantially spaced apart to stabilize said platform, said sheet member having ridges coextensive with said edges formed thereon adapted to be disposed perpendicular to the line of travel of the automobile when the platform is installed in said compartment, said ridges adapted to engage articles supported thereon to prevent same from sliding off of said platform, and a luggage case having similarly positioned ridges on the bottom thereof adapted to inter-engage with the ridges of the sheet member when said case is placed thereon, said luggage case having other ridges on the upper surface thereof adapted to interengage and mate with the ridges of an identically constructed second luggage case placed on top of said first luggage case, whereby the pile of cases will be firmly engaged upon said platform.

ROBERT GOLDMAN.

REFERENCES CITED

The following references are of record in the file of this patent:

UNITED STATES PATENTS

| Number | Name | Date |
| --- | --- | --- |
| 1,353,762 | Krumland | Sept. 21, 1920 |
| 1,459,972 | Clauson et al. | June 26, 1923 |
| 1,594,263 | Houston | July 27, 1926 |
| 1,712,836 | Mills | May 14, 1929 |
| 1,947,055 | Moorman | Feb. 13, 1934 |
| 2,391,310 | Heller | Dec. 18, 1945 |
| 2,470,314 | Lim | May 17, 1949 |
| 2,497,173 | Kosson | Feb. 14, 1950 |

FOREIGN PATENTS

| Number | Country | Date |
| --- | --- | --- |
| 276,124 | Great Britain | Aug. 25, 1927 |